United States Patent [19]
Betzold

[11] Patent Number: 6,114,410
[45] Date of Patent: Sep. 5, 2000

[54] PROPPANT CONTAINING BONDABLE PARTICLES AND REMOVABLE PARTICLES

[75] Inventor: Donald E. Betzold, Friendswood, Tex.

[73] Assignee: TechniSand, Inc., Chardon, Ohio

[21] Appl. No.: 09/129,063

[22] Filed: Aug. 4, 1998

Related U.S. Application Data

[63] Continuation-in-part of application No. 09/118,241, Jul. 17, 1998, abandoned.

[51] Int. Cl.[7] .............................. C09K 7/00; E21B 33/10; B22C 1/22
[52] U.S. Cl. .......................... 523/130; 523/131; 523/132; 523/205; 166/279
[58] Field of Search ..................... 523/130, 131, 523/132, 139, 145, 205; 166/279

[56] References Cited

U.S. PATENT DOCUMENTS

| | | |
|---|---|---|
| 2,881,837 | 4/1959 | Staudt . |
| 3,153,450 | 10/1964 | Foster et al. . |
| 3,195,635 | 7/1965 | Fast . |
| 3,217,801 | 11/1965 | Fast et al. . |
| 3,237,693 | 3/1966 | Huitt et al. . |
| 3,613,789 | 10/1971 | Son, Jr. ................................ 166/281 |
| 3,998,774 | 12/1976 | Arnold et al. . |
| 4,040,967 | 8/1977 | Nimerick et al. . |
| 4,387,769 | 6/1983 | Erbstoesser et al. . |
| 4,488,975 | 12/1984 | Almond . |
| 4,553,596 | 11/1985 | Graham et al. . |
| 4,581,253 | 4/1986 | Evans et al. . |
| 4,585,064 | 4/1986 | Graham et al. . |
| 4,597,991 | 7/1986 | Graham et al. . |
| 4,683,068 | 7/1987 | Kucera . |
| 4,694,905 | 9/1987 | Armbruster . |
| 4,716,964 | 1/1988 | Erbstoesser et al. . |
| 4,717,594 | 1/1988 | Graham et al. . |
| 4,732,920 | 3/1988 | Graham et al. . |
| 4,811,787 | 3/1989 | Navratil et al. . |
| 4,888,240 | 12/1989 | Graham et al. . |
| 4,916,182 | 4/1990 | Azzam . |
| 5,067,566 | 11/1991 | Dawson . |
| 5,098,104 | 3/1992 | Kane . |
| 5,218,038 | 6/1993 | Johnson et al. . |
| 5,350,528 | 9/1994 | Westland et al. . |
| 5,356,149 | 10/1994 | Kane . |
| 5,422,183 | 6/1995 | Sinclair et al. . |
| 5,520,250 | 5/1996 | Harry et al. . |
| 5,597,784 | 1/1997 | Sinclair et al. . |
| 5,639,806 | 6/1997 | Johnson et al. ......................... 523/130 |
| 5,699,860 | 12/1997 | Grundmann . |

OTHER PUBLICATIONS

"Fundamentals of Hydraulic Fracturing", *Journal of Petrology*, vol. 20, No. 2, Apr., 1981.
"Hydraulic proppant fracturing and gravel packing" by D. Mader, Elsevier Science Publising Company, Inc., 1989.
Technical Data Sheet, "Tempered Resin Coated Proppants", Santrol.
Technical Data Sheet, "Curable Resin Coated Proppants", Santrol.
"Selection Guide: Santrol Resin Coated Proppants", Santrol, 1992.
Technical Data Sheet, "EconoFlex: The Next Generation", Santrol, Mar. 1997.
Technical Data Sheet, "More Than 480 Million Years of Product Development", Santrol, Feb., 1994.
Company Catalog, "Fairmount Minerals, Ltd: Achieving Uncommon Performance from Earth's Most Common Minerals", Fairmount Minerals, Ltd.

*Primary Examiner*—Tae Yoon
*Attorney, Agent, or Firm*—Calfee, Halter & Griswold, LLP

[57] ABSTRACT

An improved proppant and a method of increasing the conductivity of the fractures of subterranean formations is described. The proppant contains a mixture of bondable particles and removable particles. The bondable particles within a subterranean formation, adhere to adjacent bondable particles to form a permanent, self-supporting matrix and the removable particles from the self supporting matrix the ambient conditions of the fracture. The conductivity of the fracture and the overall productivity of the hydraulic operation is increased.

18 Claims, No Drawings

PROPPANT CONTAINING BONDABLE PARTICLES AND REMOVABLE PARTICLES

This application is a continuation-in-part of U.S. application Ser. No. 09/118,241 filed Jul. 17, 1998, for "PROPPANT CONTAINING BONDABLE PARTICLES AND REMOVABLE PARTICLES" now abandoned.

BACKGROUND

1. Field of the Invention

This invention relates to proppants, and more specifically, the use of proppants in hydraulic fracturing of subterranean formations.

2. Description of Related Art

Hydraulic fracturing is a process used to stimulate oil and gas production in subterranean formations. A fracturing fluid is injected into the well casing or tubing to produce a buildup of well bore pressure. When the well bore pressure is large enough to overcome compressive earth forces, fractures form. Continued injection of the fracturing fluid increases fracture length and width.

The fracturing fluid typically includes a viscous fluid, such as, for example, a linear gel or a crosslinking gel, that carries hydraulic fracturing particles commonly known as proppants. Once the fracturing fluid transports the proppant inside the fracture, the viscosity of the fracturing fluid breaks down leaving the proppant particles in place. The fracturing fluid is then dissipated through the formation or recovered via the well bore.

Proppant particles are commonly made of sand, glass, bauxite, ceramic, and shells and range in size from about 6 to 200 mesh (U.S. Sieve Series scale). Many of these proppant particles are optionally supplied with a resin coating. A resin-coated proppant particle generally has a greater crush resistance than the core substrate material and can be used at greater depths or may be used at the same depth with increased relative conductivity. For example, resin-coated sand can be used at closure stresses up to about 10,000 psi, as compared with about 6,000 psi. for uncoated sand. The coating also serves to trap free fines from fragmented or disintegrated substrates under high closure stress.

Compressive earth stresses, or closure stresses, encountered in subterranean formations subjected to fracturing can range from 500 psi to 25,000 psi or even higher, depending upon the depth of the fracture. Accordingly, the proppant selected for a particular subterranean formation must be strong enough to resist the compressive earth forces in that formation, thereby keeping the fractures open and allowing fluid flow therethrough. Thus, sand proppant particles are generally used where closure stresses are up to about 6,000 psi, ceramics are generally used at closure stresses up to about 15,000 psi, and bauxite is generally used at closure stresses greater than about 15,000 psi.

The productivity of a subterranean fracture is dependent upon, among other things, the conductivity of the fracture. Conductivity is defined as the permeability of the proppant times the width of the fracture. Permeability, in turn, refers to the permeability of a mass or "pack" of the proppant particles and is governed by the size and shape of the proppant particles and the size of the interstitial spaces between the particles. These interstitial spaces become the passageways for the flow and recovery of subterranean fluids. Accordingly, a proppant consisting of coarse proppant particles can form a proppant pack having larger interstitial spaces to achieve higher conductivity relative to a proppant consisting of finer proppant particles.

Despite the advent of modern proppants, conductivity of proppant-filled fractures continues to be a problem. In formations at shallower depths where closure pressures are typically about 4000 psi or less, coarser proppant particles greater than about 40 mesh are commonly used. However, coarser proppant particles are susceptible to bridging in fractures during stimulation treatment. Bridging occurs when the coarse proppant particles plug narrow fractures. The result is a reduction in the overall productivity of the well bore or premature screen-out. Moreover, the stress encountered even in shallower formations may produce fines that migrate and plug the interstitial flow passages between the proppant particles, thereby drastically reducing the conductivity of the fracture.

In fractures located at greater depths where closure pressures are higher, e.g. 10,000 psi or more, proppants composed of finer particles are typically used. However, because the interstitial spaces between these finer particles is smaller, permeability and hence conductivity are inherently less.

It is desirable to have a method of increasing the conductivity of a subterranean fracture. It is also desirable to develop a proppant having increased permeability for a given particle size. It is also desirable to replace coarse proppant particles with finer proppant particles in subterranean fracturing operations while maintaining or improving the conductivity of the fracture.

SUMMARY OF THE INVENTION

The present invention provides an improved proppant and a method for improving the conductivity of fractures in subterranean formations using such proppant. The inventive proppant comprises a mixture of bondable particles and removable particles. The bondable particles, when in place in a subterranean formation, adhere to one another to form a substantially permanent, self-supporting matrix that is interspersed with removable particles. The removable particles, after formation of the matrix, can then be removed from the matrix by being dissolved or otherwise entrained in the fluid or fluids subsequently processed in the formation. As a result of this removal, the interstitial spaces in the matrix left behind increase in size, thereby achieving higher matrix porosity and hence higher conductivity in the fracture as a whole.

In accordance with a preferred embodiment of the invention, the removable particles are selected to have a size, shape and density similar to the size, shape and density of the bondable particles. With this feature, the mixture of bondable and removable particles comprising the inventive proppant remains substantially uniform during the fracturing operation.

In accordance with an especially preferred embodiment of the invention, the bondable particles include a resin compound capable of softening and preferably curing under ambient conditions encountered in the well fracture. This allows adjacent bondable particles to adhere together through both physical and chemical means during formation of the self-supporting matrix, which promotes formation of an especially strong matrix.

DETAILED DESCRIPTION

In accordance with the present invention, fracture conductivity of a subterranean formation is increased by placing in a subterranean formation a proppant comprising a mixture of bondable particles and removable or dissolvable particles.

Materials which can be used as the bondable particles in the inventive proppant can comprise any particulate material which will serve as a bondable proppant. Such materials are well known in the art, and any such material can be employed. In general, bondable proppants include any freeflowing, particulate material which can be charged down a well under the conditions of pressure, temperature and chemical environment encountered during fracturing and which, when in place in the fracture, exhibit suitable crush strengths and porosities to enhance fluid recovery. Such particles also need to be bondable under ambient conditions encountered in the formation. By being bondable is meant that the particles can join together to form a substantially permanent, self supporting matrix.

Preferred bondable proppants comprise particulate materials in which the individual particles have been provided with a coating which enhances the surface adhesion of the substrate material. Typical coating materials for this purpose comprise curable resins, that is, resins capable of being cured to a higher degree of polymerization. Single-coated, double-coated or a multiple-coated particles can be used. In double or multiple-coated particles, the outer coating can be substantially cured such that little or no cross-linking takes place upon exposure to down-hole conditions. In this type of particle, the outer coating is adapted to rupture under temperature and pressure revealing the inner coating which is capable of curing.

Examples of single-coated bondable particles which can be used in accordance with the present invention are disclosed in U.S. Pat. Nos. 4,518,039, 4,597,991, and 4,732,920 which are hereby incorporated by reference herein. Examples of a dual-coated bondable proppants which can be used in accordance with the present invention are described in U.S. Pat. Nos. 4,888,240, 4,717,594 and 4,585,064 and are hereby incorporated by reference herein. Other suitable bondable particles for use in the present invention include a dual-coated substrate and a multi-coated substrate Super DC® and Optiprop®, respectively, and available from the Santrol Corporation.

Materials which are useful as the removable particles in the inventive proppant composition comprise any particulate material which will remain substantially intact during fracturing but which will later dissolve, decompose or otherwise react in a manner such that that they can be substantially removed by a fluid subsequently processed in the wellbore. Such materials are also well known in the art and are typically useful as loss control agents, for example water soluble and acid degradable polymeric fluid loss control agents and polyester polymers that are insoluble in the wellbore fluid but degrade in the presence of water at elevated temperature in the formation. Removable particles can be either water insoluble or oil insoluble, depending on the type of fracturing fluid employed. For example, where the fracturing fluid to be employed in a typical fracturing operation is water-based the removable particle is water insoluble, and where the fracturing fluid is oil-based, the removable particle is oil insoluble. Removable particles can comprise the dissolvable particles or degradable polymers mentioned above, and can also include, for example, salts, such as sodium chloride, that disassociate in the presence of water-based formation fluids or fracturing fluids. Another example of a removable particle includes lipids that are a by-product of plants or animals, and more specifically, a collagen-based lipid that dissolves in the presence of subterranean fluid containing crude oil. Removable particles can also include certain metals, such as for example, aluminum and zinc which are dissolvable. Removable particles made of metal can be removed by fluids encountered naturally in the propped formation, such as brine and hydrocarbons. Also, removable particles can be removed by solvents employed specifically for the purpose of removing the removable particles from the matrix of bondable particles, for example, hydrochloric acid can be used to dissolve removable particles made of aluminum or zinc. The removable particle can be comprised of a variety of materials or chemicals, that bring about the desired result of increased conductivity of the fracture. The removable particles can also comprise additives that provide a secondary utility to enhance the fracturing procedure or the production yield, and are known by those skilled in the art.

The removable particles have a crush resistance strength that prevents the removable particles from being destroyed during the fracturing operation. Removable particles are destroyed when they disintegrate, crumble or fall apart under the formation stresses. Destruction of the removable particle can have adverse effect on the conductivity of the fracture, such as for example, when a removable particle is crushed to fine particles that block the interstitial spaces between the proppant particles. A removable particle, however, can undergo physical deformation by the closure stress of the formation without being destroyed.

Preferred removable particles are those that are removed from the self-supporting matrix of the bondable particles or entrained in the fluids subsequently processed in the formation after several hours from the time that the removable particles are introduced into the well bore. Preferably, there is no substantial removal of the removable particles for at least about eight hours, even more preferably for at least about 24 hours and even more preferably at least six months or one year or longer from the time that the removable particles are in place in the fracture. A time delay in the removal of removable particles can be especially advantageous when the gas well is near the end of its useful life to extend the life of the well.

In addition, the proppant herein can contain two or more types of removable particles each comprising different materials. In such a case, a portion of removable particles can be removed from the matrix at a time that is substantially different than the remaining removable particles in the proppant. Determining how long a candidate removable particle will delay significant removal can be easily determined by routine experimentation of conditions to be encountered in the formation by those skilled in the art.

In accordance with the present invention, the bondable particles, when in place in a subterranean formation, adhere to one another to form a substantially permanent, self-supporting matrix that is interspersed with removable particles. Bondable particles can form a matrix when subjected to sufficient heat or pressure or combinations thereof. For example, bondable particles preferably bond to form a matrix when subjected to combinations of temperature and pressure that range from about 70° F. to about 600° F. and from about 500 psi to about 25,000 psi, respectively. The removable particles, after formation of the matrix, can then be removed from the matrix by being dissolved or otherwise entrained in the fluid or fluids subsequently processed in the formation. As a result or this removal, the interstitial spaces in the matrix left behind increase in size, thereby achieving higher matrix porosity and hence higher conductivity in the fracture as a whole.

In a preferred embodiment of the invention herein, the bondable particles and the removable particles are similar in size, similar in shape and similar in specific gravity so that a uniform mixture is maintained during transportation of the proppant through the well bore and during the entire fracturing operation. Such similarity between particles helps to prevent separation of the particles during the fracturing operation and increases productivity.

The permeability of the proppant and the conductivity of a fracture propped by the proppant herein, depends upon the relative size and concentrations of the bondable particles and removable particles of the mixture. The proppant herein preferably comprises a range from about 10% to about 30% by volume removable particles, and more preferably, the proppant comprises a range from about 10% to about 20% by volume removable particles. Preferably, the proppant contains a range from about 70% to about 90% by volume bondable particles, and more preferably a range from about 80% to about 90% by volume bondable particles.

The relative concentrations of the bondable particles and the removable particles have an important effect on the internal stresses of the bonded matrix when the removable particles are removed. The bond between the bondable particles can substantially withstand the closure stress that might otherwise cause the proppant to realign and fill the interstitial spaces created by the dissolved particles. The substantially permanent, self-supporting matrix formed by the bondable particles can allow the fracture width to remain nearly constant. A proppant having a greater concentration of removable particles is preferably used at shallower depths. For example, in a hydraulic fracturing operation at depths of about 4,000 ft or less, a proppant herein preferably contains up to about 30% by volume removable particles; in a fracturing operation conducted at depths of about 8,000 ft or less, the proppant preferably contains up to about 20% by volume removable particles; and in a fracturing operation conducted at depths greater than about 8,000 ft the proppant preferably contains about 10% by volume or less removable particles. Choosing the identity and ratio of the bondable particles and removable particles for a particular embodiment of the invention herein is determined by conditions of the formation and factors that can be determined through routine experimentation by an ordinary person skilled in the art.

In order to more fully and clearly describe the present invention so that those skilled in the art may better understand how to practice the present invention, the following example is given.

EXAMPLE

A conductivity test was conducted at 100 psi closure pressure on the proppant of the present invention and on a conventional proppant to determine the effects of soluble proppant on proppant pack conductivity. A 500 gram mixture of 10% by volume sodium chloride (removable particle) of an average particle size of about 800 to 1000 microns, and 90% by volume 20/40 Super DC by Santrol Inc. (bondable particle) was prepared. The sodium chloride and the Super DC were mixed in a 1000 ml glass vessel and passed through a riffle splitter to ensure adequate mixing and equal dispersion of the salt within the resin coated proppant. Next, the above proppant containing removable particles and a control proppant of 20/40 Super DC were loaded into the test apparatus as follows:

In accordance with standard practices in the field 63.06 grams of each proppant was loaded into separate Stim-Lab type 10 sq. in. linear flow cells to give a loading of 2 lbs/sq.ft. of proppant and leveled loosely with a universal bevel blade device. A 0.5 mm copper shim was placed on top of each pack followed by an O-ring fitted to a piston which was lightly coated with vacuum grease. First, the conductivity of the 20/40 Super DC control was tested. The loaded control cell was placed in a 75 ton Dake press and the closure stress was increased to 100 psi at a rate of 100 psi/min. The cell was saturated with 2% by weight deoxygenated aqueous KCl solution and then purged of air at the ambient laboratory temperature that ranged between about 70° F. to about 80° F.

A nitrogen reservoir accumulator was then filled with a 2% by weight KCl aqueous solution that was deoxygenated with nitrogen to a level of less than 15 ppb of oxygen. The reservoir accumulator was connected to the test cell and set at a driving pressure of 400 psi. The connection of the reservoir accumulator to the cell was made through two 150 ml sample cylinders filled with 100 mesh Oklahoma 90 AFS sand from Unimin Corporation with ceramic heaters in order to saturate the test fluid with silica. It should be noted that the closure stresses on the proppant pack in the cell are stated in terms of net closure on the pack which is equal to the gross pressure applied to the press minus the 400 psi pressure applied by the reservoir accumulator. A Rosemont 3051 differential pressure transducer was connected to the cell and was calibrated with water columns to obtain pressure readings within 0.0001 psi accuracy.

The system was allowed 30 minutes to come to equilibrium and a series of five conductivity measurements were taken and averaged. After the readings were taken at ambient temperature, the temperature was increased to 250° F. and held for 8 hours for temperature uniformity. Next, five readings were taken at each 10 hour intervals up to 50 hours total test duration.

The entire test procedure was repeated in the same apparatus using the cell loaded with the proppant containing 10% sodium chloride of the present invention. The measured conductivities are as follows:

| Proppant Type | Conductivity @ 250°, 100 psi closure, 50 hours |
| --- | --- |
| • 20/40 Super DC (control sample) | 10,206 md-ft |
| • 90% Super DC 20/40 with 10% NaCl (invention) | 17,280 md-ft |

Other modifications and variations of the present invention are possible in light of the above teachings. For example, additives and other modifying agents may be added to one or more of the bondable particles, removable particles or the mixture that makes up the proppant. It is to be understood, however, that changes may be made in the particular embodiments described above which are within the full intended scope of the invention as defined in the appended claims.

What is claimed is:

1. A proppant for use in fracturing a subterranean formation, the proppant comprising:
   a mixture of bondable particles and removable particles,
   the bondable particles comprising particles coated with a curable resin and being capable of adhering to one another within the subterranean formation to form a substantially permanent, self-supporting matrix interspersed with removable particles; and,
   the removable particles being capable of being substantially removed from the matrix by a fluid processed in the subterranean formation after the bondable particles form the matrix.

2. The proppant of claim 1, wherein the mixture remains substantially uniform during the fracturing operation.

3. The proppant of claim 2, wherein the removable particles are not substantially destroyed during the fracturing operation.

4. The proppant of claim 3, wherein the removable particles are removable from the matrix in the presence of crude oil.

5. The proppant of claim 3, wherein the removable particles are removable from the matrix in the presence of water.

6. The proppant of claim 3, wherein the removable particles exhibit no substantial dissolution for at least eight hours from the time that the removable particles are in place in the subterranean formation.

7. The proppant of claim 1 wherein the removable particles comprise metal.

8. The proppant of claim 7 wherein the removable particles comprise aluminum or zinc or combinations thereof.

9. The proppant of claim 1 wherein the bondable particles comprise sand and the removable particles comprise aluminum.

10. The proppant of claim 1 wherein the bondable particles comprise bauxite and the removable particles comprise zinc.

11. The proppant of claim 2, wherein the removable particles have a particle size, shape, and density substantially similar to the particle size, shape, and density of the bondable particles.

12. The proppant of claim 1, wherein the use of the proppant in fracturing a subterranean formation increases the conductivity of the fracture.

13. The proppant of claim 3, wherein the mixture comprises from about 10% to about 30% by weight removable particles and from about 70% to 90% by weight bondable particles.

14. The proppant of claim 13, wherein the removable particles are comprised of materials selected from the group consisting of: polymer, salt, surfactant, lipids, metal, and combinations thereof.

15. The proppant of claim 13, wherein the mixture comprising removable particles of at least two different compositions and that are removed from the matrix at substantially different times.

16. The proppant of claim 14, wherein the removable particles are comprised of a biodegradable lipid.

17. The proppant of claim 16, wherein the lipid is derived from an animal or a vegetable by-product.

18. The proppant of claim 16, wherein the lipid is collagen-based.

* * * * *